(12) United States Patent
Shintani et al.

(10) Patent No.: US 11,249,473 B2
(45) Date of Patent: Feb. 15, 2022

(54) REMOTE DRIVING MANAGING APPARATUS, AND COMPUTER READABLE STORAGE MEDIUM

(71) Applicant: HONDA MOTOR CO., LTD., Tokyo (JP)

(72) Inventors: Hidekazu Shintani, Saitama (JP); Takumi Machida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 16/355,833

(22) Filed: Mar. 17, 2019

(65) Prior Publication Data
US 2019/0294160 A1    Sep. 26, 2019

(30) Foreign Application Priority Data

Mar. 23, 2018    (JP) .............................. JP2018-055727

(51) Int. Cl.
*G05D 1/00* (2006.01)
*G06Q 50/30* (2012.01)
*G06Q 10/10* (2012.01)

(52) U.S. Cl.
CPC ......... *G05D 1/0038* (2013.01); *G05D 1/0061* (2013.01); *G06Q 10/1097* (2013.01); *G06Q 50/30* (2013.01); *G05D 2201/0213* (2013.01)

(58) Field of Classification Search
CPC .............. G05D 1/0038; G05D 1/0061; G05D 2201/0213; G05D 1/0027; G05D 1/0231;
(Continued)

(56) References Cited

U.S. PATENT DOCUMENTS 9,494,935 B2 * 11/2016 Okumura ............... B60W 30/00
9,505,305 B2 * 11/2016 Tsuyunashi ........... B60W 30/09
(Continued)

FOREIGN PATENT DOCUMENTS

JP    2000311299 A    11/2000
JP    2004206218 A    7/2004
(Continued)

OTHER PUBLICATIONS

Office Action issued for counterpart Japanese Application No. 2018-055727, issued by the Japanese Patent Office on Oct. 19, 2021 (drafted on Oct. 13, 2021).
(Continued)

*Primary Examiner* — Michael V Kerrigan

(57) ABSTRACT

A remote driving managing apparatus is provided. The remote driving managing apparatus includes: a path information acquiring unit that acquires path information indicating a path of movement to a destination of a vehicle; a time period identifying unit that, based on the path information, identifies a scheduled time period in which the vehicle is scheduled to travel through a remote driving section which is a section in which the vehicle travels by being remotely driven; and a driver selecting unit that refers to management data for managing an available remote driving time period of each of a plurality of remote drivers that are capable of remotely driving vehicles, and selects a remote driver that is available for remote driving of the vehicle during the scheduled time period identified by the time period identifying unit.

14 Claims, 9 Drawing Sheets

(58) Field of Classification Search
CPC .. G05D 1/0257; G06Q 50/30; G06Q 10/1097; G01C 21/3407
See application file for complete search history.

(56) References Cited

U.S. PATENT DOCUMENTS

| | | | |
|---|---|---|---|
| 10,583,803 B2* | 3/2020 | Ferguson | G06Q 30/0631 |
| 2015/0346718 A1 | 12/2015 | Stenneth | |
| 2018/0011485 A1* | 1/2018 | Ferren | G05D 1/0061 |
| 2018/0284759 A1* | 10/2018 | Michalakis | B60W 10/04 |
| 2019/0163176 A1* | 5/2019 | Wang | G05D 1/0061 |
| 2019/0354111 A1* | 11/2019 | Cheng | G05D 1/0011 |

FOREIGN PATENT DOCUMENTS

| | | | |
|---|---|---|---|
| JP | 2007295279 A | 11/2007 | |
| JP | 2012248053 A | 12/2012 | |
| JP | 2019160146 A | 9/2019 | |
| WO | 2014147711 A1 | 9/2014 | |

OTHER PUBLICATIONS

Office Action issued for counterpart Chinese Application 201910097951.8, issued by the China National Intellectual Property Administration dated Nov. 23, 2021.

* cited by examiner

| REMOTE DRIVER ID | AVAILABLE DRIVING TIME PERIOD | | RESERVATION STATUS | | | |
|---|---|---|---|---|---|---|
| | | | 9:00~9:30 | 13:00~14:00 | VEHICLE A | VEHICLE B |
| 111111 | 2018/4/1 | 9:00~18:00 | ... | ... | ... | ... |
| | ... | ... | | | | |
| 111112 | 2018/4/1 | 12:00~14:00 | — | — | — | — |
| | 2018/4/1 | 17:00~20:00 | ... | ... | ... | ... |
| 111113 | 2018/4/1 | 19:00~23:00 | — | — | — | — |
| | 2018/4/2 | 18:00~21:00 | ... | ... | ... | ... |
| | ... | ... | | | | |

REMOTE DRIVING MANAGING APPARATUS, AND COMPUTER READABLE STORAGE MEDIUM

The contents of the following Japanese patent application are incorporated herein by reference: NO. 2018-055727 filed on Mar. 23, 2018.

BACKGROUND

1. Technical Field

The present invention relates to a remote driving managing apparatus, and a computer readable storage medium.

2. Related Art

Techniques for an electrically powered vehicle to remotely drive other vehicles or for a remotely driving apparatus for remote driving to remotely drive vehicles are known (see Patent Literatures 1, 2, for example).

PRIOR ART LITERATURES

Patent Literatures

[Patent Literature 1] Japanese Patent Application Publication No. 2000-311299
[Patent Literature 2] Japanese Patent Application Publication No. 2004-206218

It is desirable to provide a technique of appropriately allocating, to a remotely driven vehicle that needs remote driving, a remote driver to remotely drive the remotely driven vehicle.

BRIEF DESCRIPTION OF THE DRAWINGS

FIG. 6 schematically illustrates exemplary management data 600.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
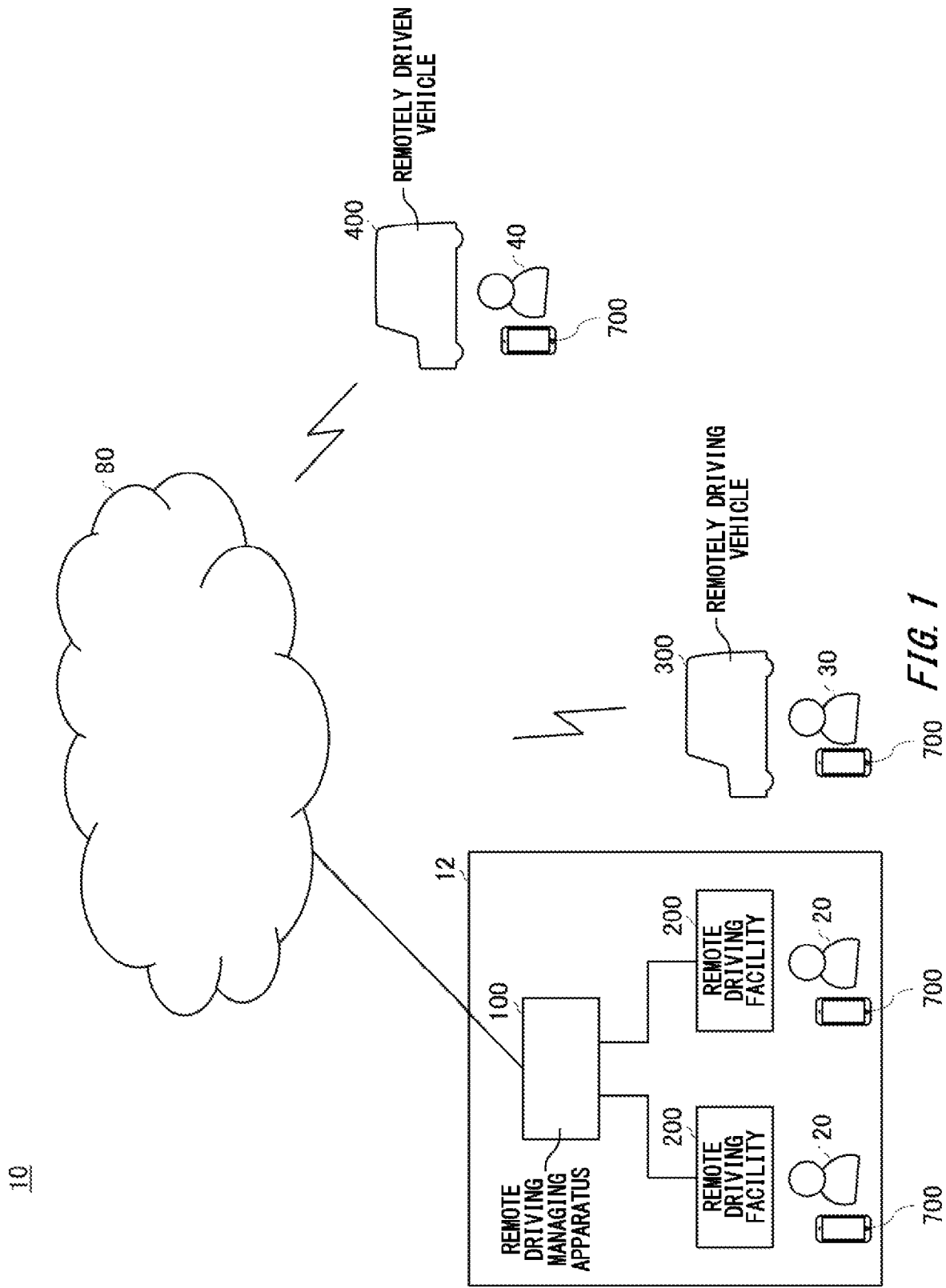
FIG. 1 schematically illustrates an exemplary remote driving system 10.

FIG. 1 schematically illustrates an exemplary remote driving system 10. The remote driving system 10 includes a remote driving management center 12, a remotely driving vehicle 300, and a remotely driven vehicle 400. Although one remotely driving vehicle 300 is illustrated as an example in FIG. 1, the number of remotely driving vehicles 300 may be larger than one. In addition, although one remotely driven vehicle 400 is illustrated as an example in FIG. 1, the number of remotely driven vehicles 400 may be larger than one. The remote driving management center 12 includes a remote driving managing apparatus 100, and a plurality of remote driving facilities 200. Although two remote driving facilities 200 are illustrated as an example in FIG. 1, the number of remote driving facilities 200 may be three or larger.

The remote driving facilities 200 are facilities for remotely driving remotely driven vehicles 400 via a network 80. The network 80 may be any network, and for example the network 80 may include at least one of the Internet, a mobile phone network such as a so-called 3G (3rd Generation), LTE (Long Term Evolution), 4G (4th Generation), or 5G (5th Generation) network, a public wireless LAN (Local Area Network), and a private network.

The remote driving facilities 200 are facilities created to simulate driver's seats of cars, for example. A remote driving facility 200 has a manipulating unit that accepts manipulation by a driver 20 to remotely drive a remotely driven vehicle 400, and a communication unit that transmits, to the remotely driven vehicle 400, a signal corresponding to manipulation of the manipulating unit. The remote driving facility 200 is an exemplary remotely driving apparatus. The driver 20 is an exemplary remote driver. The manipulating unit includes manipulation members necessary for driving a vehicle such as a wheel, an accelerator pedal, a brake pedal, a shift lever, or a blinker lever. In addition, the manipulating unit may further include manipulation members for manipulating equipment such as a car navigation system, an air conditioner, audio equipment, slide doors, a sunroof, or a seat heater. The communication unit receives images of an environment around a remotely driven vehicle 400 that are captured by image-capturing units provided to the remotely driven vehicle 400. The remote driving facility 200 has a display unit that displays the images of the environment around the remotely driven vehicle 400 received by the communication unit. The remote driver 20 manipulates the manipulating unit while viewing the images displayed on the display unit to thereby realize remote driving of the remotely driven vehicle 400.

The remotely driving vehicle 300 is a car with a remote driving function to remotely drive a remotely driven vehicle 400 via the network 80. The remotely driving vehicle 300 may be able to be driven by manipulation of a manipulating unit provided to the remotely driving vehicle 300 (which driving is referred to as manual driving in some cases). In addition, the remotely driving vehicle 300 may support so-called automated driving.

The remotely driving vehicle 300 has a manipulating unit that accepts manipulation by a driver 30, and a communication unit that communicates with a remotely driven vehicle 400 and the remote driving managing apparatus 100. The remotely driving vehicle 300 is an exemplary remotely driving apparatus. The driver 30 is an exemplary remote driver. The manipulating unit includes manipulation members necessary for driving a vehicle such as a wheel, an accelerator pedal, a brake pedal, a shift lever, or a blinker lever. In addition, the manipulating unit may further include manipulation members for manipulating equipment such as an air conditioner, audio equipment, a car navigation system, slide doors, a sunroof, or a seat heater. The communication unit receives images of an environment around a remotely driven vehicle 400 that are captured by image-capturing units provided to the remotely driven vehicle 400. The remotely driving vehicle 300 has a display unit that displays the images of the environment around the remotely driven vehicle 400 received by the communication unit. The remotely driving vehicle 300 for example supports a manual driving mode and a remotely driving mode. In the manual driving mode, the remotely driving vehicle 300 travels according to manipulation of the manipulating unit, and in the remotely driving mode, the remotely driving vehicle 300 transmits, to the remotely driven vehicle 400, signals according to manipulation of the manipulating unit. The driver 30 can remotely drive the remotely driven vehicle 400 by switching the mode of the remotely driving vehicle 300 parked in a parking space at home to the remotely driving mode, for example.

The remotely driven vehicle 400 is a car supporting automated driving, and supporting remote driving by a remote driving facility 200 or the remotely driving vehicle 300. When in the automated driving mode, the remotely driven vehicle 400 performs travelling, stopping, turning, and so on of itself without being dependent on steering, accelerator pedal manipulation, brake pedal manipulation, gear shift manipulation, and so on by a driver, using apparatuses such as image-capturing units or radars provided to the remotely driven vehicle 400, and positional information and map information. When in the remote driving mode, the remotely driven vehicle 400 performs travelling, stopping, turning, and so on according to signals received from a remote driving facility 200 or the remotely driving vehicle 300.

For example, if a path of movement for moving to a destination by automated driving includes a remote driving section which is a section in which the remotely driven vehicle 400 travels by being remotely driven, the remotely driven vehicle 400 travels through the section by remote driving. The remote driving section is for example a section in which automated driving is not possible, a section in which automated driving is prohibited, a section in which automated driving is not appropriate, and so on. The remote driving section is not limited to them, but may be a section which an occupant 40 of the remotely driven vehicle 400 wishes for remote driving therethrough.

The remote driving managing apparatus 100 manages an available remote driving time period of each of a plurality of remote drivers. The remote driving managing apparatus 100 may store management data for managing an available remote driving time period of each of a plurality of remote drivers. An available remote driving time period is a time period in which a remote driver can remotely drive a remotely driven vehicle 400, and for example is registered by the remote driver. A driver 20 may register an available remote driving time period in the remote driving managing apparatus 100 via a remote driving facility 200. In addition, the driver 30 may register an available remote driving time period in the remote driving managing apparatus 100 via the remotely driving vehicle 300. In addition, a remote driver may register an available remote driving time period in the remote driving managing apparatus 100 using a communication terminal 700 and via the network 80. The communication terminal 700 may be a mobile phone such as a smart phone, a tablet terminal, a PC (Personal Computer), or the like.

The remote driving managing apparatus 100 acquires path information indicating a path of movement to a destination of the remotely driven vehicle 400, and, based on the path information, identifies a scheduled time period in which the remotely driven vehicle 400 travels through a remote driving section. Then, the remote driving managing apparatus 100 refers to the management data to select a remote driver that can remotely drive the remotely driven vehicle 400 during the identified scheduled time period.

The remote driving managing apparatus 100 may select one remote driver, and cause the remote driver to execute remote driving of the remotely driven vehicle 400. In addition, the remote driving managing apparatus 100 may select a plurality of remote drivers, and present them as candidates to a driver seated on the driver's seat of a remotely driven vehicle, and cause a remote driver designated by the driver seated on the driver's seat of the remotely driven vehicle to execute remote driving of the remotely driven vehicle 400. Candidates of remote drivers may be presented via a remote driving facility 200, the remotely driving vehicle 300, and a communication terminal 700, and a remote driver may be designated via a remote driving facility 200, the remotely driving vehicle 300, and a communication terminal 700.

The remote driving managing apparatus 100 transmits a remote driving instruction to the remote driver that is determined to be caused to execute remote driving of the remotely driven vehicle 400. The remote driving managing apparatus 100 transmits a remote driving instruction to a communication terminal 700 of the remote driver, for example. In addition, the remote driving managing apparatus 100 may transmit a remote driving instruction to a remote driving facility 200 or the remotely driving vehicle 300 corresponding to the selected remote driver.

By the remote driving managing apparatus 100 executing the above-mentioned processes, a remote driver to remotely drive the remotely driven vehicle 400 can be appropriately allocated if a path of movement of the remotely driven vehicle 400 includes a remote driving section.

For example, it is in some cases difficult for less-experienced drivers, the elderly, sick persons, injured persons or the like to manually drive. If so, those types of person switch the modes of remotely driven vehicles 400 to automated driving modes as a general rule. In that case, if there is an automated driving-prohibited section in the advancing direction, travelling of the remotely driven vehicles 400 inevitably stops since neither manual driving nor automated driving is possible. As a measure against it, it is conceivable to select a path of movement not including an automated driving-prohibited section, but this measure cannot cope with a situation where all the plurality of paths of movement to a destination include automated driving-prohibited sections. In addition, in some cases, sections in which automated driving was possible might suddenly become automated driving-prohibited sections due to sudden heavy rain or the like, and it is difficult to cope with such a situation. In contrast to this, with the remote driving managing apparatus 100 according to the present embodiment, if the remotely driven vehicle 400 has to travel through an automated driving-prohibited section, a remote driver to make the remotely driven vehicle 400 travel through the section by remote driving can be allocated appropriately, and it is possible to prevent travelling of the remotely driven vehicle 400 from being stopped.

Figure 2:
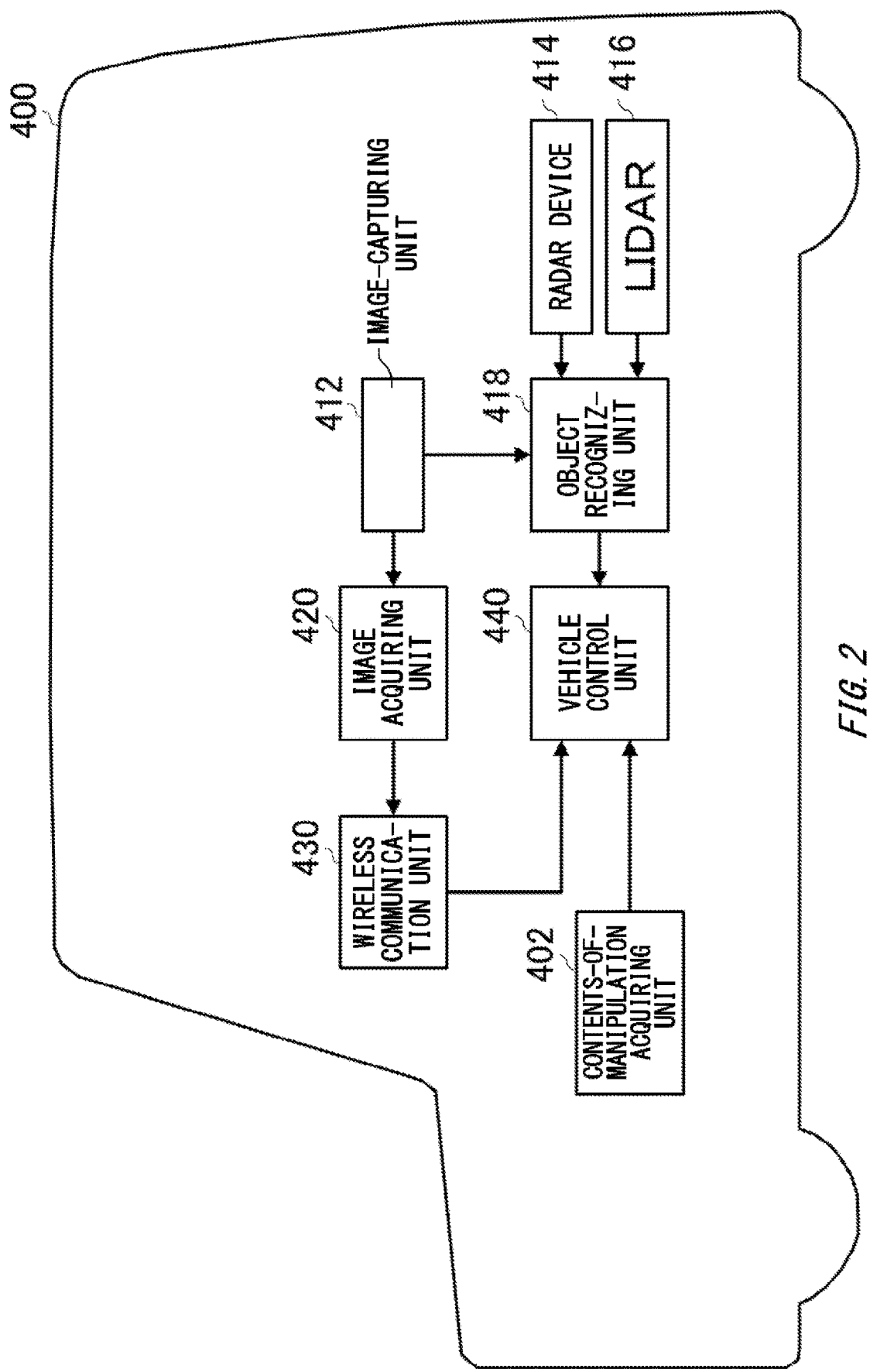
FIG. 2 schematically illustrates an exemplary functional configuration of a remotely driven vehicle 400.

FIG. 2 schematically illustrates an exemplary functional configuration of the remotely driven vehicle 400. The remotely driven vehicle 400 includes a contents-of-manipulation acquiring unit 402, an image-capturing unit 412, a radar device 414, a LIDAR (Light Detection and Ranging) 416, an object recognizing unit 418, an image acquiring unit 420, a wireless communication unit 430, and a vehicle control unit 440.

The contents-of-manipulation acquiring unit 402 acquires contents of manipulation of a manipulating unit provided to the remotely driven vehicle 400. For example, the contents-of-manipulation acquiring unit 402 acquires a steering angle of a wheel, a pedal pressure manipulation amount of an accelerator pedal, a pedal pressure manipulation amount of a brake pedal, or the like.

The image-capturing unit 412 for example is a digital camera utilizing a solid-state image sensor such as a CCD (Charge Coupled Device), a CMOS (Complementary Metal Oxide Semiconductor), or the like. The image-capturing unit 412 includes one or more image-capturing units that are attached to predetermined locations of the remotely driven vehicle 400. If an image of a space in front of the remotely driven vehicle 400 is to be captured, an image-capturing unit 412 is attached to a front windshield upper portion, a room mirror rear surface, or the like. If a plurality of image-capturing units 412 are attached, the plurality of image-capturing units 412 may capture images facing different directions. An image-capturing unit 412 captures an image of an environment around the remotely driven vehicle 400 periodically repeatedly, for example. An image-capturing unit 412 may be a stereo camera.

The radar device 414 radiates radio waves such as millimeter waves around the remotely driven vehicle 400, and senses radio waves reflected on objects (reflected waves) to sense at least positions (distances, and azimuths) of the objects. The radar device 414 includes one or more radar devices that are attached to predetermined locations of the remotely driven vehicle 400. The radar device 414 may sense the position and speed of an object by an FM-CW (Frequency Modulated Continuous Wave) method.

The LIDAR 416 irradiates an environment around the remotely driven vehicle 400 with light, and measures scattered light. The LIDAR 416 senses the distance to a target based on a length of time that elapses from light-emission until light-reception. Light used for the irradiation is pulsed laser light, for example. The LIDAR 416 includes one or more LIDARs that are attached to predetermined locations of the remotely driven vehicle 400.

The object recognizing unit 418 recognizes the position, type, speed or the like of an object based on results of sensing by some or all of the image-capturing unit 412, radar device 414, and LIDAR 416. The object recognizing unit 418 outputs a result of the recognition to the vehicle control unit 440. In addition, the object recognizing unit 418 may output results of sensing by the image-capturing unit 412, radar device 414, and LIDAR 416 to the vehicle control unit 440 directly without modification as necessary.

The image acquiring unit 420 acquires images captured by the image-capturing unit 412. The wireless communication unit 430 wirelessly communicates with the remote driving managing apparatus 100, a remote driving facility 200, and the remotely driving vehicle 300 via the network 80. If the remotely driven vehicle 400 is in the remotely driven mode, the wireless communication unit 430 transmits images acquired by the image acquiring unit 420 to the remote driving managing apparatus 100, a remote driving facility 200, or the remotely driving vehicle 300. In addition, if the remotely driven vehicle 400 is in the remotely driven mode, the wireless communication unit 430 receives signals for remote driving from the remote driving managing apparatus 100, a remote driving facility 200, or the remotely driving vehicle 300, and outputs the signals to the vehicle control unit 440.

The vehicle control unit 440 controls the remotely driven vehicle 400. The vehicle control unit 440 may have a position acquiring unit that acquires the position of the remotely driven vehicle 400. The position acquiring unit receives positional information about the remotely driven vehicle 400 from a navigation apparatus provided to the remotely driven vehicle 400, for example. The navigation apparatus of the remotely driven vehicle 400 has a GNSS (Global Navigation Satellite System) receiver, for example, and the GNSS receiver locates the position of the remotely driven vehicle 400 based on signals received from the GNSS satellite. Note that a GNSS receiver may be provided to the position acquiring unit.

The vehicle control unit 440 may acquire destination information indicating a destination of the remotely driven vehicle 400, and path information indicating a path of movement to the destination. The vehicle control unit 440 acquires the destination information and path information from the navigation apparatus provided to the remotely driven vehicle 400, for example.

The vehicle control unit 440 acquires first map information including at least map information about the path of movement indicated by the path information. The vehicle control unit 440 receives the first map information from the navigation apparatus of the remotely driven vehicle 400, for example. In addition, the vehicle control unit 440 may receive the first map information via the network 80 from a map management server that manages map information about each geographic location. The first map information is, for example, information in which road shapes are represented by links indicating roads, and nodes connected by the links. The first map information may include the curvatures of roads, POI (Point Of Interest) information, or the like. The first map information may be updated at any time.

The vehicle control unit 440 may further acquire second map information including at least map information about the path of movement indicated by the path information. Similar to the first map information, the vehicle control unit 440 may receive the second map information from the navigation apparatus of the remotely driven vehicle 400, or may receive the second map information via the network 80. The second map information is map information more precise than the first map information. The second map information includes, for example, information about the middles of lanes, information about the boundaries between lanes, or the like. In addition, the second map information may include road information, traffic regulation information, or the like. The second map information may be updated at any time.

If the remotely driven vehicle 400 is in the automated driving mode, the vehicle control unit 440 may use the position acquired by the position acquiring unit, the information received from the object recognizing unit 418, and the first map information to control travelling of the remotely driven vehicle 400. The vehicle control unit 440 may further use the second map information to control travelling of the remotely driven vehicle 400. If the remotely driven vehicle 400 is in the manual driving mode, the vehicle control unit 440 may control travelling of the remotely driven vehicle 400 according to contents of manipulation acquired by the contents-of-manipulation acquiring unit 402.

If the remotely driven vehicle 400 is in the remotely driven mode, the vehicle control unit 440 controls travelling of the remotely driven vehicle 400 according to signals that the wireless communication unit 430 receives from the remote driving managing apparatus 100, a remote driving facility 200, or the remotely driving vehicle 300.

Figure 3:
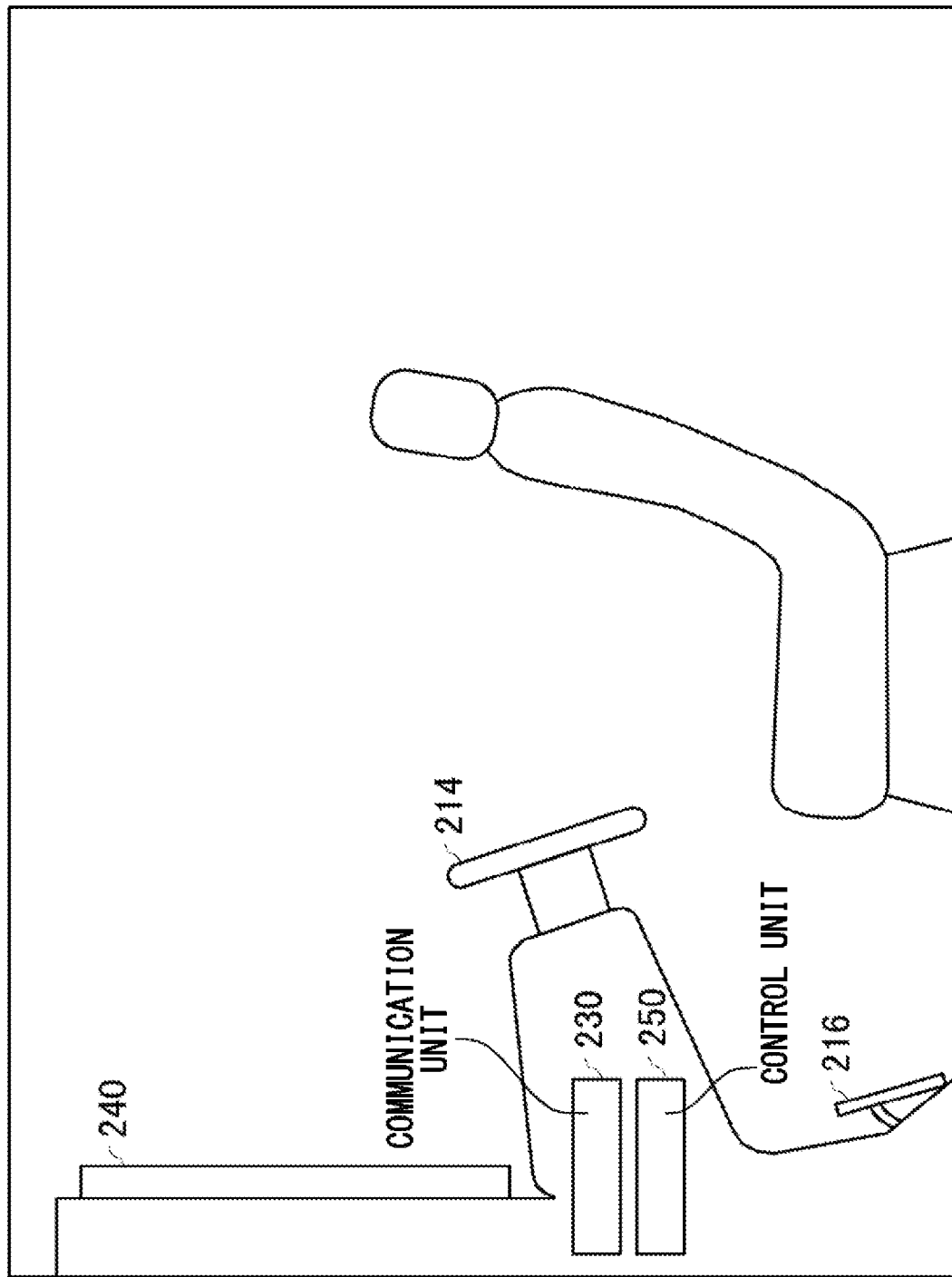
FIG. 3 schematically illustrates an exemplary remote driving facility 200.

FIG. 3 schematically illustrates an exemplary remote driving facility 200. In FIG. 3, illustration of manipulation members other than a wheel 214 and a pedal 216 is omitted.

The remote driving facility 200 includes a communication unit 230, a display unit 240, and a control unit 250. The communication unit 230 communicates with the remote driving managing apparatus 100. In addition, the communication unit 230 communicates with the remotely driven vehicle 400. The communication unit 230 may communicate with the remotely driven vehicle 400 via the remote driving managing apparatus 100. In addition, the communication unit 230 may communicate with the remotely driven vehicle 400 via the network 80, but not via the remote driving managing apparatus 100.

The communication unit 230 receives an image transmitted by the wireless communication unit 430 of the remotely driven vehicle 400. The display unit 240 displays the image that the communication unit 230 received from the remotely driven vehicle 400. Note that, instead of the display unit 240, the remote driving facility 200 may include a projector and a screen, and in this case the projector may project the image received by the communication unit 230 onto the screen.

The control unit 250 acquires contents of manipulation of a manipulation member of the remote driving facility 200, and causes the communication unit 230 to transmit signals indicating the contents of manipulation to the remotely driven vehicle 400. The control unit 250 causes the communication unit 230 to transmit a steering angle of the wheel 214, a pedal pressure manipulation amount of the pedal 216, or the like, for example.

Figure 4:
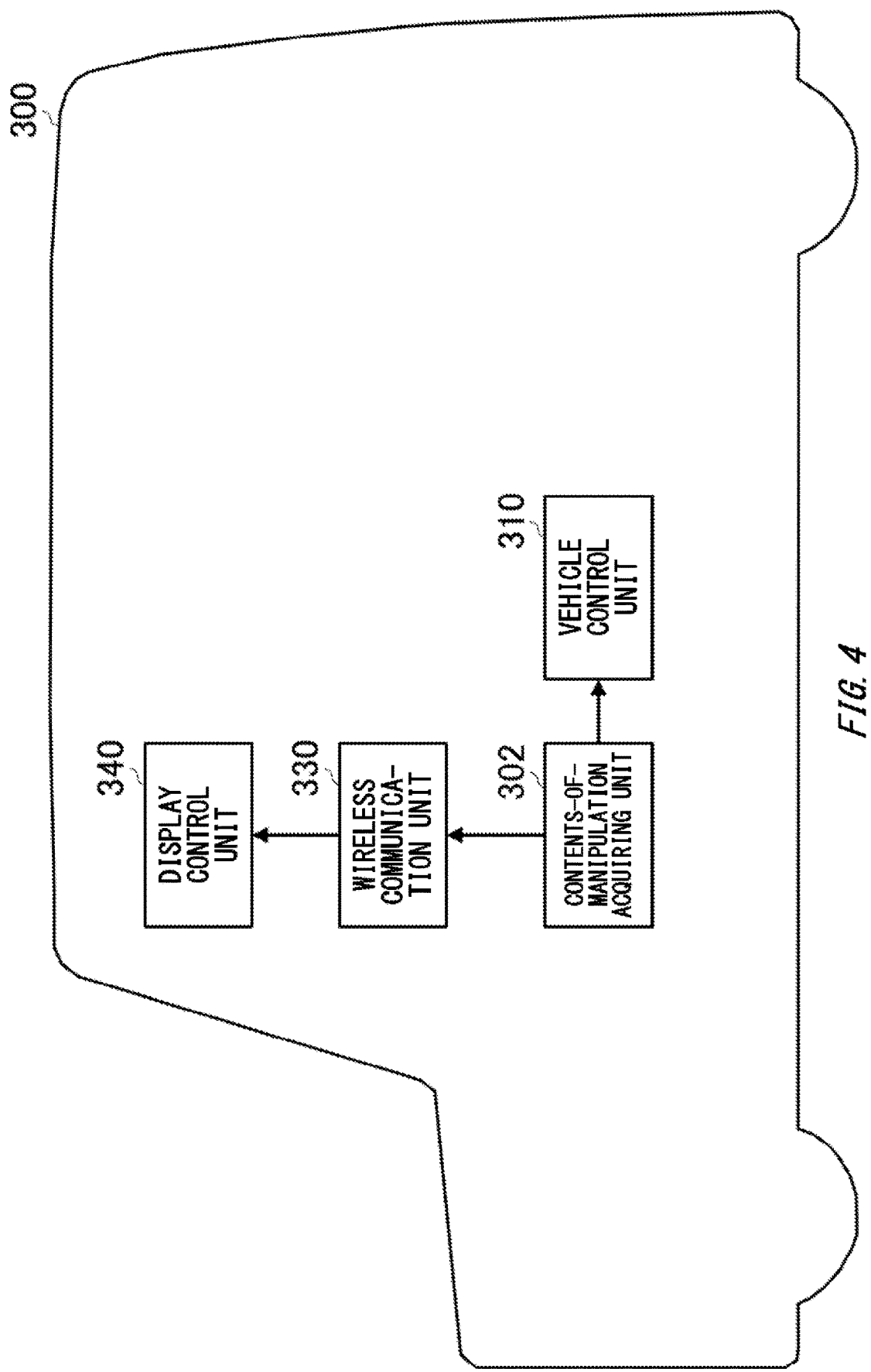
FIG. 4 schematically illustrates an exemplary functional configuration of a remotely driving vehicle 300.

FIG. 4 schematically illustrates an exemplary functional configuration of the remotely driving vehicle 300. The remotely driving vehicle 300 includes a contents-of-manipulation acquiring unit 302, a vehicle control unit 310, a wireless communication unit 330, and a display control unit 340.

The contents-of-manipulation acquiring unit 302 acquires contents of manipulation of a manipulating unit provided to the remotely driving vehicle 300. For example, the contents-of-manipulation acquiring unit 302 acquires a steering angle of a wheel, a pedal pressure manipulation amount of an accelerator pedal, a pedal pressure manipulation amount of a brake pedal, or the like.

If the remotely driving vehicle 300 is in the manual driving mode, the contents-of-manipulation acquiring unit 302 outputs signals indicating the acquired contents of manipulation to the vehicle control unit 310. The vehicle control unit 310 controls the remotely driving vehicle 300 according to the signals acquired from the contents-of-manipulation acquiring unit 302.

If the remotely driving vehicle 300 is in the remotely driving mode, the contents-of-manipulation acquiring unit 302 outputs the acquired contents of manipulation to the wireless communication unit 330. The wireless communication unit 330 transmits the signals acquired from the contents-of-manipulation acquiring unit 302 to the remotely driven vehicle 400 via the network 80.

If the remotely driving vehicle 300 is in the remotely driving mode, the wireless communication unit 330 receives images transmitted by the wireless communication unit 430 of the remotely driven vehicle 400, and outputs the images to the display control unit 340. The display control unit 340 causes a display unit provided to the remotely driving vehicle 300 to display the received images.

If the remotely driving vehicle 300 supports automated driving, it may further include configurations similar to the image-capturing unit 412, radar device 414, LIDAR 416, and object recognizing unit 418.

Figure 5:
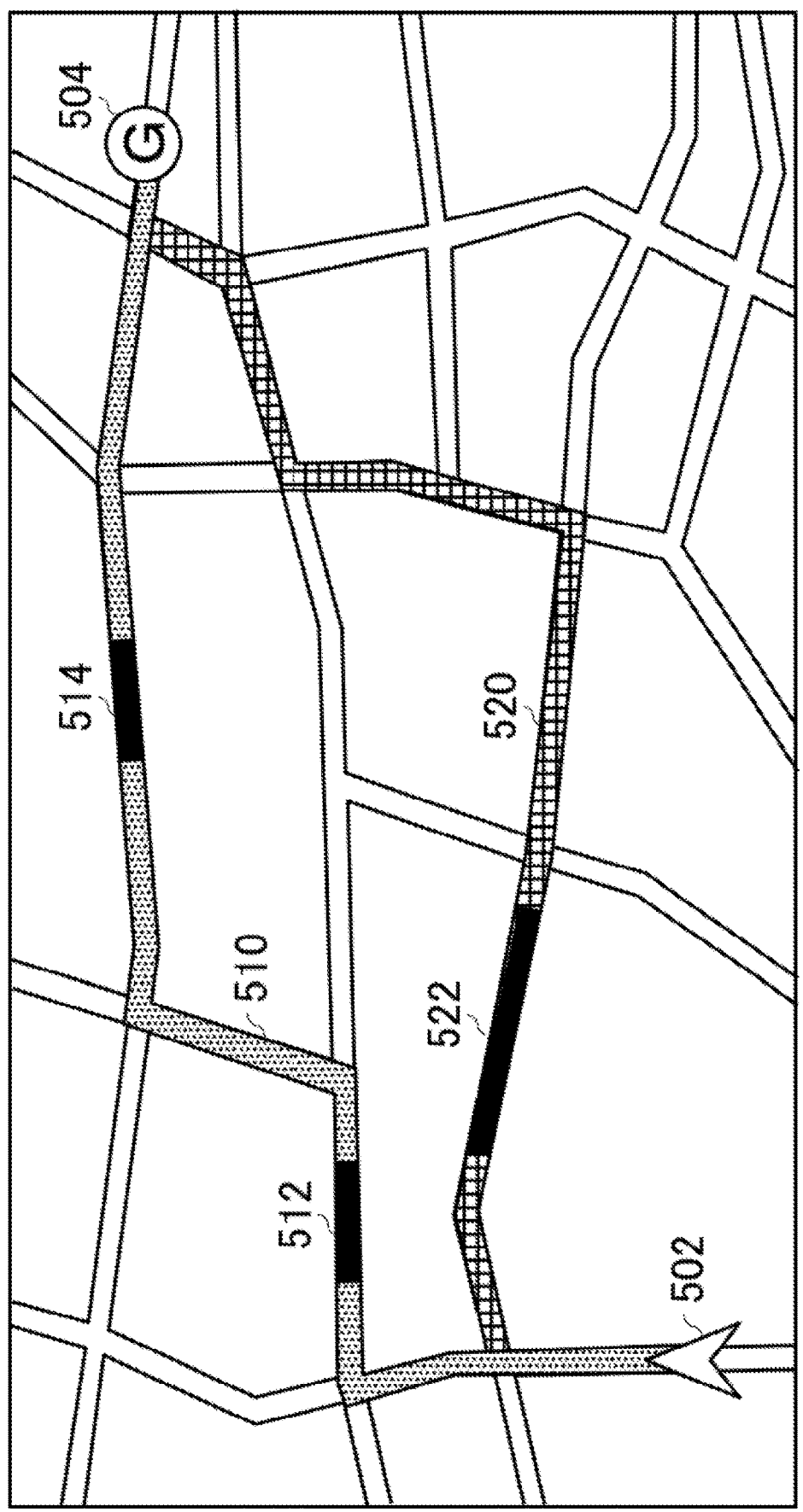
FIG. 5 schematically illustrates exemplary remote driving sections in paths of movement.

FIG. 5 schematically illustrates exemplary remote driving sections in paths of movement of the remotely driven vehicle 400. As examples of paths of movement from a place of departure 502 to a destination 504, FIG. 5 illustrates a path of movement 510 and a path of movement 520. The path of movement 510 includes a remote driving section 512, and a remote driving section 514. The path of movement 520 includes a remote driving section 522.

For example, if the remote driving managing apparatus 100 receives, from the remotely driven vehicle 400 that is positioned at the place of departure 502 and is travelling in the automated driving mode, path information indicating the path of movement 510, the remote driving managing apparatus 100 identifies a scheduled time period in which the remotely driven vehicle 400 travels through the remote driving section 512 and the remote driving section 514. Based on a time at which the remotely driven vehicle 400 arrives at the starting point of the remote driving section 512, and a length of time required for the remotely driven vehicle 400 to travel through the remote driving section 512 by remote driving that are derived by the navigation apparatus or vehicle control unit 440 provided to the remotely driven vehicle 400, for example, the remote driving managing apparatus 100 identifies a scheduled time period in which the remotely driven vehicle 400 travels through the remote driving section 512. The remote driving managing apparatus 100 may derive a time at which the remotely driven vehicle 400 arrives at the starting point of the remote driving section 512 based on information about the travelling speed of the remotely driven vehicle 400, information about the road conditions of the path of movement 510, and the like.

FIG. 6 schematically illustrates exemplary management data 600. The management data 600 is data for managing an available remote driving time period, and the reservation status of each of a plurality of remote drivers. In the example illustrated in FIG. 6, available driving time periods and the reservation status are registered in association with remote driver IDs indicating remote drivers. In the example illustrated in FIG. 6, for example, Apr. 1, 2018, 9:00 to 18:00 is registered as the available remote driving time period of a remote driver ID: 111111. 9:00 to 9:30 is allocated for scheduled remote driving of a vehicle A, and 13:00 to 14:00 is allocated for scheduled remote driving of a vehicle B.

For example, if the remote driving managing apparatus 100 receives path information indicating the path of movement 510 from the remotely driven vehicle 400, the remote driving managing apparatus 100 selects a remote driver that is available for remote driving during the scheduled time period in which the remotely driven vehicle 400 is scheduled to travel through the remote driving section 512, and a remote driver that is available for remote driving during the scheduled time period in which the remotely driven vehicle 400 is scheduled to travel through the remote driving section 514.

If a path of movement includes a plurality of remote driving sections, as the path of movement 510 does, the remote driving managing apparatus 100 may prioritize selection of a single remote driver for the plurality of remote driving sections. For example, if a plurality of remote drivers are available for remote driving during the scheduled time period in which the remotely driven vehicle 400 is scheduled to travel through the remote driving section 512, and a plurality of remote drivers are also available for remote driving during the scheduled time period in which the remotely driven vehicle 400 is scheduled to travel through the remote driving section 514, a remote driver that is available for remote driving during both the scheduled time periods is selected. Thereby, as compared with the case where different remote drivers are allocated for a plurality of remote driving sections, a remote driver that is more accustomed to remote driving of the remotely driven vehicle 400 can be allocated for remote driving, and this contributes to the safety improvement or comfortability improvement of remote driving.

If a path of movement includes a plurality of remote driving sections, and intervals between scheduled time periods are shorter than a predetermined value, the remote driving managing apparatus 100 may treat the scheduled time periods as one scheduled time period. For example, if a path of movement includes two remote driving sections, and a length of time between the scheduled end time of the first remote driving section, and the scheduled start time of the second remote driving section is shorter than a predetermined value, a time period from the scheduled start time of the first remote driving section until the scheduled end time of the second remote driving section is seen as one scheduled time period. Thereby, it is possible to prevent the occurrence of a situation where the mode is switched to remote driving immediately after the mode is switched from remote driving to automated driving.

In the case that the remote driving managing apparatus 100 receives path information indicating the path of movement 510 from the remotely driven vehicle 400, if no remote drivers are available for remote driving during the scheduled time period in which the remotely driven vehicle 400 is scheduled to travel through the remote driving section 512, or if no remote drivers are available for remote driving during the scheduled time period in which the remotely driven vehicle 400 is scheduled to travel through the remote driving section 514, the remote driving managing apparatus 100 may refer to the management data 600 to generate a different path of movement, and present the different path of movement to a driver seated on the driver's seat of a remotely driven vehicle. The remote driving managing apparatus 100 generates, for example, a path of movement which is among a plurality of paths of movement to a destination and enables any of a plurality of remote drivers to remotely drive the remotely driven vehicle 400 through all the remote driving sections included in the path of movement, and presents the path of movement to the driver seated on the driver's seat of the remotely driven vehicle. As a specific example, if a remote driver is available for remote driving during the time period in which the remotely driven vehicle 400 is scheduled to travel through the remote driving section 522 in the path of movement 520, the remote driving managing apparatus 100 presents the path of movement 520 to the driver seated on the driver's seat of the remotely driven vehicle. The remote driving managing apparatus 100 may display the path of movement 520 on the display unit provided to the remotely driven vehicle 400 or a communication terminal 700 of the driver seated on the driver's seat of the remotely driven vehicle. Thereby, if a path of movement indicated by path information received from the remotely driven vehicle 400 does not allow allocation of a remote driver, an alternative path of movement that allows allocation of a remote driver can be presented to the driver seated on the driver's seat of the remotely driven vehicle.

Figure 7:
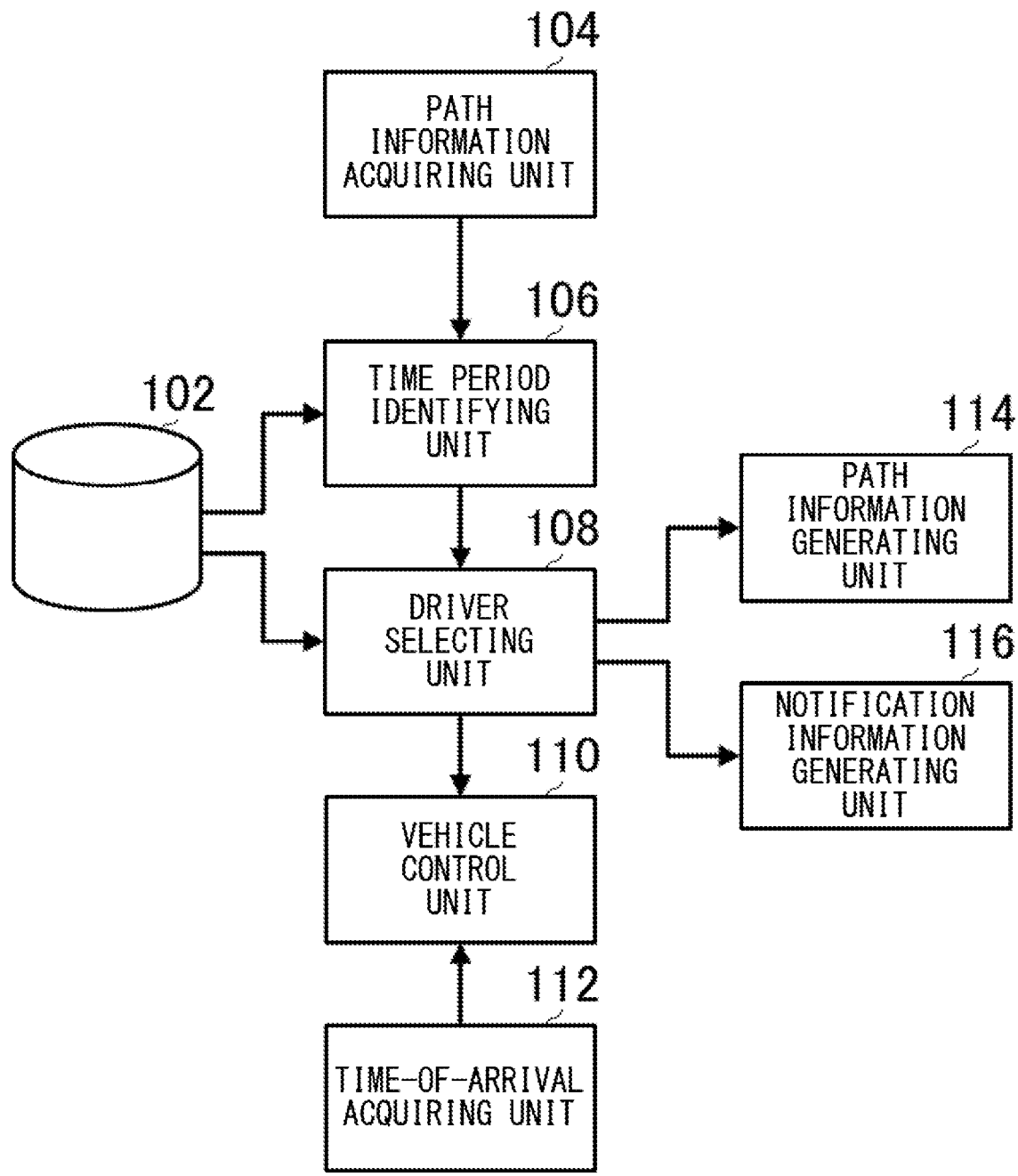
FIG. 7 schematically illustrates an exemplary functional configuration of a remote driving managing apparatus 100.

FIG. 7 schematically illustrates an exemplary functional configuration of the remote driving managing apparatus 100. The remote driving managing apparatus 100 includes a storage unit 102, a path information acquiring unit 104, a time period identifying unit 106, a driver selecting unit 108, a vehicle control unit 110, a time-of-arrival acquiring unit 112, a path information generating unit 114, and a notification information generating unit 116.

The storage unit 102 stores various types of information. The storage unit 102 stores the management data 600 illustrated as an example in FIG. 6. In addition, the storage unit 102 stores information for identifying remote driving sections. For example, the storage unit 102 stores information in which remote driving sections of roads all over the country are registered.

The path information acquiring unit 104 acquires path information indicating paths of movement to a destination of the remotely driven vehicle 400. The path information acquiring unit 104 receives path information from the remotely driven vehicle 400, for example. In addition, the path information acquiring unit 104 may receive, via the network 80, path information from a server managing path information about a plurality of remotely driven vehicles 400.

Based on the path information acquired by the path information acquiring unit 104, the time period identifying unit 106 identifies a scheduled time period in which the remotely driven vehicle 400 is scheduled to travel through a remote driving section. If a path of movement indicated by the path information includes a plurality of remote driving sections, the time period identifying unit 106 may identify a scheduled time period of each of the plurality of remote driving sections.

The driver selecting unit 108 refers to the management data 600 stored on the storage unit 102 to select a remote driver that is available for remote driving of the remotely driven vehicle 400 during the scheduled time period identified by the time period identifying unit 106. If a path of movement indicated by the path information includes a plurality of remote driving sections, the driver selecting unit 108 may prioritize selection of a single remote driver for the plurality of remote driving sections.

The vehicle control unit 110 controls at least one of the path of movement and travelling speed of the remotely driven vehicle 400. For example, if none of a plurality of remote drivers are available for remote driving of the remotely driven vehicle 400 during the scheduled time period identified by the time period identifying unit 106, the vehicle control unit 110 alters the path of movement of the remotely driven vehicle 400 or alters the travelling speed of the remotely driven vehicle 400 such that the scheduled time period in which the remotely driven vehicle 400 is scheduled to travel through a remote driving section shifts to be included within the available remote driving time period of at least one of the plurality of remote drivers.

The time-of-arrival acquiring unit 112 acquires a desired time of arrival at the destination of the remotely driven vehicle 400. The time-of-arrival acquiring unit 112 receives a desired time of arrival from the remotely driven vehicle 400, for example. The desired time of arrival is transmitted by the remotely driven vehicle 400 to the remote driving managing apparatus 100 according to manipulation by an occupant of the remotely driven vehicle 400, for example. If none of a plurality of remote drivers are available for remote driving of the remotely driven vehicle 400 during the scheduled time period identified by the time period identifying unit 106, the vehicle control unit 110 controls at least one of the path of movement and travelling speed of the remotely driven vehicle 400 based on the management data 600 stored on the storage unit 102 and the desired time of arrival acquired by the time-of-arrival acquiring unit 112. For example, the vehicle control unit 110 makes a path of movement of the remotely driven vehicle 400 longer or lowers the travelling speed of the remotely driven vehicle 400 while ensuring that the remotely driven vehicle 400 arrives at the destination no later than the desired time of arrival.

If none of a plurality of remote drivers are available for remote driving of the remotely driven vehicle 400 during the scheduled time period identified by the time period identifying unit 106, the path information generating unit 114 refers to the management data 600 to generate path information indicating another path of movement to the destination of the remotely driven vehicle 400. The remote driving managing apparatus 100 may present the path information generated by the path information generating unit 114 to the driver seated on the driver's seat of the remotely driven vehicle. The remote driving managing apparatus 100 transmits the path information to the remotely driven vehicle 400, for example. In addition, the remote driving managing apparatus 100 transmits the path information to the communication terminal 700 of the driver seated on the driver's seat of the remotely driven vehicle, for example.

If none of the plurality of remote drivers are available for remote driving of the remotely driven vehicle 400 during the scheduled time period identified by the time period identifying unit 106, the notification information generating unit 116 generates notification information based on the available remote driving time period of at least one of the plurality of remote drivers. The notification information generating unit 116 generates, for example, notification information indicating a difference between the start time of the scheduled time period identified by the time period identifying unit 106 and the start time of a time period (i) which is at or after the start time of the scheduled time period identified by the time period identifying unit 106; and (ii) during which at least one of the plurality of remote drivers is available for remote driving of the remotely driven vehicle 400. As a specific example, if the difference is 30 minutes, the notification information generating unit 116 generates notification information that notifies that if a time at which the remotely driven vehicle 400 arrives at the remote driving section is delayed by 30 minutes, a remote driver is available when the remotely driven vehicle 400 travels through the remote driving section. The remote driving managing apparatus 100 may present the notification information generated by the notification information generating unit 116 to the driver seated on the driver's seat of the remotely driven vehicle. The remote driving managing apparatus 100 transmits the notification information to the remotely driven vehicle 400, for example. In addition, the remote driving managing apparatus 100 transmits the notification information to the communication terminal of the driver seated on the driver's seat of the remotely driven vehicle, for example.

Figure 8:
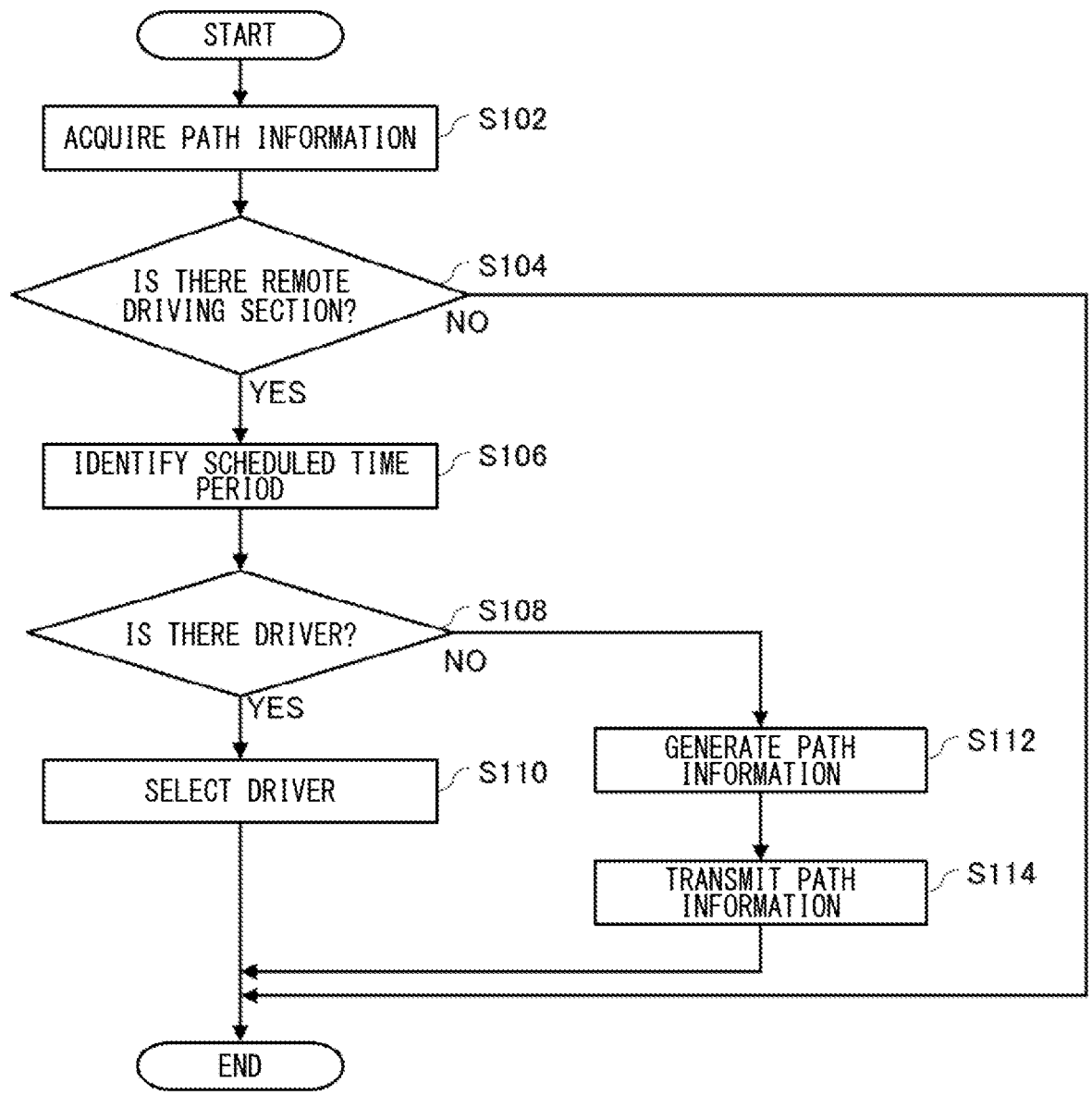
FIG. 8 schematically illustrates an exemplary flow of processes to be performed by the remote driving managing apparatus 100.

FIG. 8 schematically illustrates an exemplary flow of processes to be performed by the remote driving managing apparatus 100. Each process illustrated in the figure is executed by a control unit provided to the remote driving managing apparatus 100 on its own initiative.

At Step (steps are abbreviated to S's in some cases) 102, the path information acquiring unit 104 acquires path information indicating a path of movement of the remotely driven vehicle 400. At S104, it is judged whether or not there is a remote driving section in the path of movement indicated by the path information acquired at S102. If it is judged that there is a remote driving section, the process proceeds to S106, and if not, the process ends.

At S106, the time period identifying unit 106 identifies the scheduled time period in which the remotely driven vehicle 400 is scheduled to travel through the remote driving section. At S108, the driver selecting unit 108 refers to the management data 600 to judge whether or not a remote driver is available for remote driving of the remotely driven vehicle 400 during the scheduled time period identified at S106. If it is judged that a remote driver is available, the process proceeds to S110, and if not, the process proceeds to S112.

At S110, the driver selecting unit 108 selects a remote driver that is available for remote driving of the remotely driven vehicle 400 during the scheduled time period identified at S106. The remote driving managing apparatus 100 may request the selected remote driver to remotely drive the remotely driven vehicle 400.

At S112, the path information generating unit 114 refers to the management data to generate path information indicating another path of movement to the destination of the remotely driven vehicle 400. At S114, the path information generated at S112 is transmitted to a communication terminal of the driver seated on the driver's seat of the remotely driven vehicle or to the remotely driven vehicle 400. If, in response to the transmitted path information, the remote driving managing apparatus 100 receives information indicating agreement with alteration of the path information from the communication terminal of the driver seated on the driver's seat of the remotely driven vehicle or from the remotely driven vehicle 400, the remote driving managing apparatus 100 may select a remote driver that is available for remote driving during the scheduled time period in which the remotely driven vehicle 400 is scheduled to travel through a remote driving section included in the path of movement indicated by the altered path information.

Note that although, in the example explained with reference to FIG. 8, path information is generated and transmitted if it is judged at S108 that no remote drivers are available, the notification information generating unit 116 may generate and transmit the notification information in this case. In addition, the vehicle control unit 110 may control at least one of the path of movement of the remotely driven vehicle 400 and the travelling speed of the remotely driven vehicle 400 such that the scheduled time period in which the remotely driven vehicle 400 is scheduled to travel through the remote driving section shifts to be included within the available remote driving time period of at least one of a plurality of remote drivers.

Figure 9:
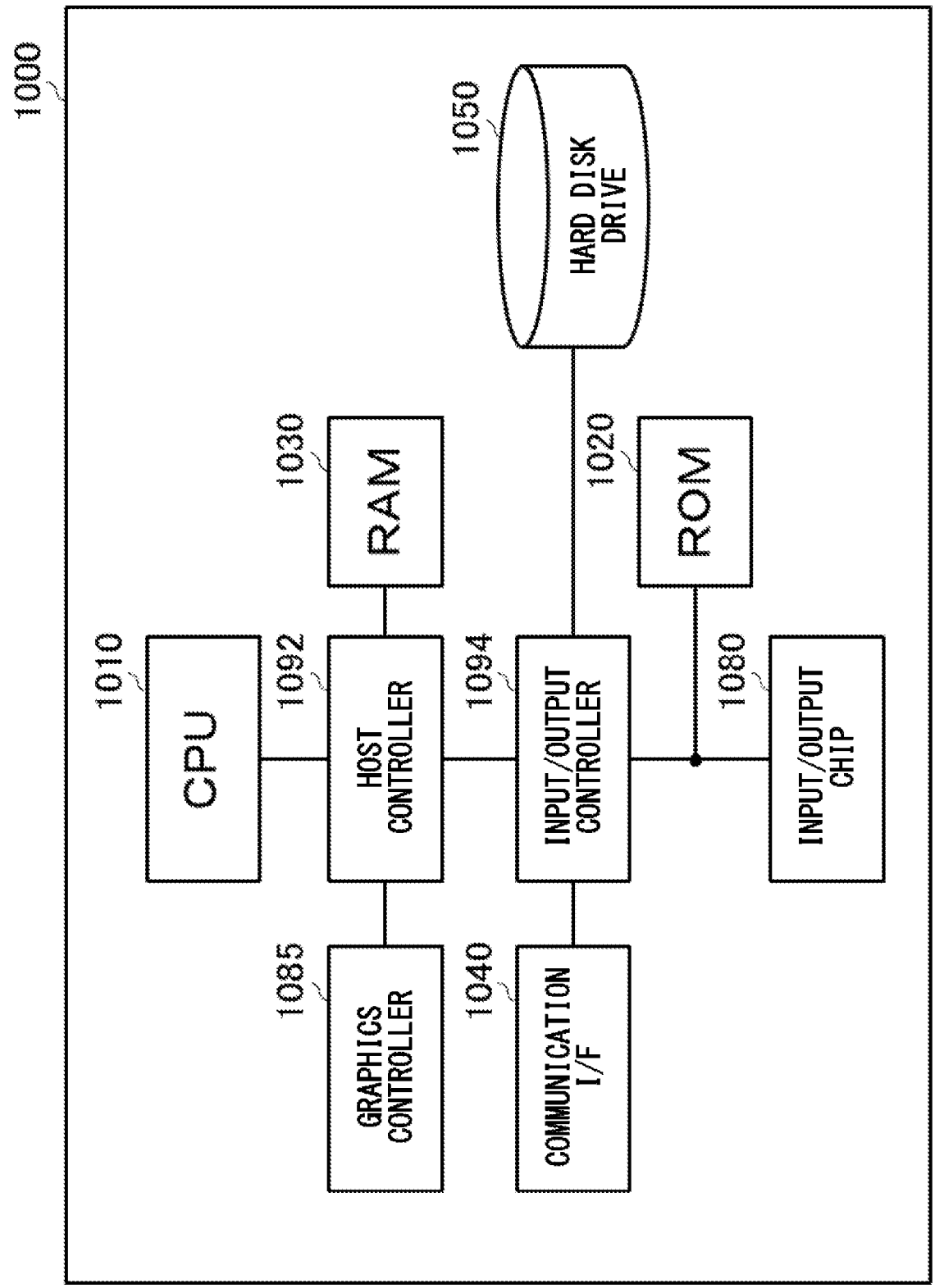
FIG. 9 schematically illustrates an exemplary computer 1000 to function as the remote driving managing apparatus 100.

FIG. 9 schematically illustrates an exemplary hardware configuration of a computer 1000 to function as the remote driving managing apparatus 100. The computer 1000 according to the present embodiment includes: a CPU peripheral unit having a CPU 1010, a RAM 1030, and a graphics controller 1085 that are interconnected by a host controller 1092; and an input/output unit having a ROM 1020, a communication I/F 1040, a hard disk drive 1050, and an input/output chip 1080 that are connected to the host controller 1092 by an input/output controller 1094.

The CPU 1010 performs operations based on programs stored on the ROM 1020 and RAM 1030, and performs control of each unit. The graphics controller 1085 acquires image data generated by the CPU 1010 or the like on a frame buffer provided in the RAM 1030, and displays the image data on a display. Instead of this, the graphics controller 1085 may include therein a frame buffer to store image data generated by the CPU 1010 or the like.

The communication I/F 1040 communicates with another device via a network through a wired or wireless connection. In addition, the communication I/F 1040 functions as hardware to perform communication. The hard disk drive 1050 stores programs and data to be used by the CPU 1010.

The ROM 1020 stores a boot-program to be executed by the computer 1000 at the time of activation and programs or the like that depend on hardware of the computer 1000. The input/output chip 1080 connects various types of input/output devices to the input/output controller 1094 via, for example, a parallel port, a serial port, a keyboard port, a mouse port, and the like.

Programs to be provided to the hard disk drive 1050 via the RAM 1030 are provided by a user in the form stored on a recording medium such as an IC card. The programs are read out from the recording medium, installed on the hard disk drive 1050 via the RAM 1030, and executed at the CPU 1010.

The programs that are installed on the computer 1000, and make the computer 1000 function as the remote driving managing apparatus 100 may act on the CPU 1010 or the like to make the computer 1000 function as each unit of the remote driving managing apparatus 100. Information processing described in these programs are read in by the computer 1000 to thereby function as the storage unit 102, path information acquiring unit 104, time period identifying unit 106, driver selecting unit 108, vehicle control unit 110, time-of-arrival acquiring unit 112, path information generating unit 114, and notification information generating unit 116, which are specific means attained by cooperation between software and various types of hardware resources mentioned above. Then, with these specific means, the unique remote driving managing apparatus 100 corresponding to a purpose of use of the computer 1000 in the present embodiment can be constructed by realizing operations on or processing of information corresponding to the purpose of use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: remote driving system; 12: remote driving management center; 20: driver; 30: driver; 40: occupant; 80: network; 100: remote driving managing apparatus; 102: storage unit; 104: path information acquiring unit; 106: time period identifying unit; 108: driver selecting unit; 110: vehicle control unit; 112: time-of-arrival acquiring unit; 114: path information generating unit; 116: notification information generating unit; 200: remote driving facility; 214: wheel; 216: pedal; 230: communication unit; 240: display unit; 250: control unit; 300: remotely driving vehicle; 302: contents-of-manipulation acquiring unit; 310: vehicle control unit; 330: wireless communication unit; 340: display control unit; 400: remotely driven vehicle; 402: contents-of-manipulation acquiring unit; 412: image-capturing unit; 414: radar device; 416: LIDAR; 418: object recognizing unit; 420: image acquiring unit; 430: wireless communication unit; 440: vehicle control unit; 502: place of departure; 504: destination; 510: path of movement; 512: remote driving section; 514: remote driving section; 520: path of movement; 522: remote driving section; 600: management data; 1000: computer; 1010: CPU; 1020: ROM; 1030: RAM; 1040: communication I/F; 1050: hard disk drive; 1080: input/output chip; 1085: graphics controller; 1092: host controller; 1094: input/output controller

What is claimed is:

1. A remote driving managing apparatus comprising a processor configured to:
   acquire path information indicating a path of movement to a destination of a vehicle;
   identify, based on the path information, a scheduled time period in which the vehicle is scheduled to travel through a remote driving section which is a section in which the vehicle travels by being remotely driven;
   refer to management data for managing an available remote driving time period of each of a plurality of remote drivers that are capable of remotely driving vehicles, and select a remote driver that is available for remote driving of the vehicle during the identified scheduled time period; and
   control at least one of the path of movement of the vehicle and a travelling speed of the vehicle such that, if none of the plurality of remote drivers are available for remote driving of the vehicle during the identified scheduled time period, the identified scheduled time period in which the vehicle is scheduled to travel through the remote driving section shifts to be included within an available remote driving time period of at least one of the plurality of remote drivers.

2. The remote driving managing apparatus according to claim 1, wherein
   the vehicle is a vehicle with an automated driving system, and
   the remote driving section is a section where automated driving is prohibited.

3. The remote driving managing apparatus according to claim 1, wherein if the path of movement includes a plurality of remote driving sections, the processor is further configured to prioritize selection of a single remote driver for the plurality of remote driving sections.

4. The remote driving managing apparatus according to claim 3, wherein if the path of movement includes a first remote driving section, and a second remote driving section, a plurality of remote drivers are available for remote driving of the vehicle during a first scheduled time period in which the vehicle is scheduled to travel through the first remote driving section, and a plurality of remote drivers are also available for remote driving of the vehicle during a second scheduled time period in which the vehicle is scheduled to travel through the second remote driving section, the processor is further configured to select a remote driver that is available for remote driving during both the first scheduled time period and the second scheduled time period.

5. The remote driving managing apparatus according to claim 1, wherein the processor is further configured to:
acquire a desired time of arrival at the destination; and control the path of movement of the vehicle based on the management data and the desired time of arrival if none of the plurality of remote drivers are available for remote driving of the vehicle during the identified scheduled time period.

6. The remote driving managing apparatus according to claim 5, wherein the processor is further configured to control the path of movement of the vehicle such that a moving distance of the vehicle increases while ensuring that the vehicle arrives at the destination no later than the desired time of arrival.

7. The remote driving managing apparatus according to claim 5, wherein the processor is further configured to lower the travelling speed of the vehicle while ensuring that the vehicle arrives at the destination no later than the desired time of arrival.

8. The remote driving managing apparatus according to claim 1, wherein the processor is further configured to refer to the management data, and generate path information indicating another path of movement to the destination if none of the plurality of remote drivers are available for remote driving of the vehicle during the identified scheduled time period.

9. The remote driving managing apparatus according to claim 8, wherein processor is further configured to generate the path information indicating a path of movement which is among a plurality of paths of movement to the destination, and enables any of the plurality of remote drivers to remotely drive the vehicle through all remote driving sections included in the path of movement.

10. The remote driving managing apparatus according to claim 1, wherein the processor is further configured to generate notification information based on an available remote driving time period of at least one of the plurality of remote drivers if none of the plurality of remote drivers are available for remote driving of the vehicle during the identified scheduled time period.

11. The remote driving managing apparatus according to claim 10, wherein the processor is further configured to generate the notification information indicating a difference between a start time of the identified scheduled time period, and a start time of a time period (i) which is at or after the start time of the identified scheduled time period, and (ii) during which at least one of the plurality of remote drivers is available for remote driving of the vehicle.

12. The remote driving managing apparatus according to claim 1, wherein if the path of movement includes two remote driving sections, a length of time between a scheduled end time of a first remote driving section and a scheduled start time of a second remote driving section is shorter than a predetermined value, the processor is further configured to treat a time period from a scheduled start time of the first remote driving section to a scheduled end time of the second remote driving section as one scheduled time period, and selects a remote driver that is available for remote driving of the vehicle during the one scheduled time period.

13. The remote driving managing apparatus according to claim 1, wherein the processor is further configured to:
acquire a desired time of arrival at the destination; and control the travelling speed of the vehicle based on the management data and the desired time of arrival if none of the plurality of remote drivers are available for remote driving of the vehicle during the identified scheduled time period.

14. A non-transitory computer readable storage medium having stored thereon a program that, when executed by a computer, causes the computer to perform operations including:
acquire path information indicating a path of movement to a destination of a vehicle;
identify, based on the path information, a scheduled time period in which the vehicle is scheduled to travel through a remote driving section which is a section in which the vehicle travels by being remotely driven;
refer to management data for managing an available remote driving time period of each of a plurality of remote drivers that are capable of remotely driving vehicles, and selects a remote driver that is available for remote driving of the vehicle during the identified scheduled time period; and
control at least one of the path of movement of the vehicle and a travelling speed of the vehicle such that, if none of the plurality of remote drivers are available for remote driving of the vehicle during the identified scheduled time period, the identified scheduled time period in which the vehicle is scheduled to travel through the remote driving section shifts to be included within an available remote driving time period of at least one of the plurality of remote drivers.

* * * * *